2,986,545
Patented May 30, 1961

2,986,545

ALIPHATIC-9-FLUORENE-PLASTICIZED VINYL RESIN COMPOSITIONS

John T. Fitzpatrick, Charleston, and Samuel W. Tinsley, South Charleston, W. Va., assignors to Union Carbide Corporation, a corporation of New York No Drawing. Filed Dec. 31, 1958, Ser. No. 784,031

20 Claims. (Cl. 260—31.8)

The present invention relates to novel plasticized resin compositions, and in particular, to plasticized vinyl resin compositions incorporating certain aliphatic-substituted derivatives of fluorene as plasticizers.

The expanding use of vinyl resins has created a need for better plasticizers to be incorporated with such materials. Plasticizers are required, for instance, to reduce the molding temperature of vinyl resins and to increase the flexibility of films which may be calendered, cast, or deposited from lacquers. Also, plasticizers are incorporated with certain vinyl resins to form resilient elastomeric compositions which have a host of applications. There are many properties which are desired in the plasticizers: they should exhibit substantial compatibility or solvating power for resins, they should resist extraction by oils or water and they should not exude or "sweat-out" from plasticized resin compositions, nor should they gradually volatilize or migrate to other objects in contact with the plasticized compositions. It is also important that plasticizers be stable at elevated temperature so that they do not release noxious fumes during compounding operations. In addition plasticizers should be non-toxic, non-corrosive and free from objectionable odor. Furthermore, plasticizers should retain their effectiveness at low temperatures so that the plasticized resin compositions do not become brittle when cooled.

To date, as far as known, the art has not succeeded in developing an "ideal" plasticizer for vinyl resins which is suitable for use under all circumstances, nor is it claimed that the present invention accomplishes such a result. The invention does, however, provide a class of compounds which exhibit valuable properties as novel plasticizers for vinyl resins and which are superior in certain respects to commonly used materials.

The class of compounds found to be effective as plasticizers for vinyl resins in accordance with the invention are the aliphatic-9-substituted derivatives of fluorene represented by the general formula:

(I)
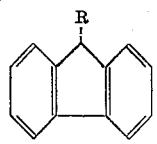

wherein R designates a monovalent or divalent, saturated or unsaturated aliphatic radical containing from about 4 to about 18 carbon atoms and preferably from about 8 to about 13 carbon atoms, as for instance, an alkyl radical such as a butyl, hexyl, octyl, decyl, tridecyl, pentadecyl octadecyl radical and the like; an alkenyl radical such as a butenyl, hexenyl, octenyl, decenyl, tridecenyl, pentadecenyl, octadecenyl radical and the like; an alkylidene radical such as a butanylidene, hexanylidene, octanylidene, decanylidene, tridecanylidene, pentadecanylidene, octadecanylidene radical and the like; and alkenylidene radical such as a butenylidene, hexenylidene, octenylidene, decenylidene, tridecenylidene, pentadecenylidene, octadecenylidene radical, and the like, etc. of these, especially good results have been obtained utilizing unsaturated aliphatic-9-substituted fluorenes as plasticizers. Also included within the class of plasticizers contemplated by the invention are aliphatic-9-substituted fluorene mixtures such as those represented above by Formula I, wherein R designates a mixture of the aforementioned aliphatic radicals. In addition, it is to be noted that the aliphatic-9-substituted fluorenes suitable for use as plasticizers in accordance with the invention can be substituted on the aromatic nucleus by groups which are non-reactive with vinyl resins during the practice of the invention, as for instance, halogen atoms such as chlorine or bromine atoms, alkyl or alkoxy radicals and the like.

The aliphatic-9-substituted fluorenes hereinabove described can be obtained from any convenient source. For example, Pullman et al., Bull. Soc. Chim., vol. 18, page 702 (1951), teaches the production of 9-alkylidenefluorenes by the condensation of an alkylaldehyde such as 2-ethylhexanal with fluorene. As disclosed therein, a reaction mixture containing the alkylaldehyde and fluorene is azeotropically refluxed in the presence of both small amounts of caustic such as potassium hydroxide and a solvent entrainer such as toluene, while removing the water of condensation formed during the course of the reaction. Upon completion of the reaction, as determined, for instance, by a cessation in the formation and recovery of water of condensation, the reaction mixture is cooled, washed with dilute mineral acid such as dilute hydrochloric acid and with water, and subsequently distilled so as to yield a 9-alkylidenefluorene product. The product can then be hydrogenated in any conventional manner, as for example, by reaction with hydrogen under pressure, in the presence of a hydrogenation catalyst such as Raney nickel, palladium or platinum, and generally a solvent such as methanol, so as to form the corresponding 9-alkylfluorene product. In like manner, fluorene can be reacted with an olefinic aldehyde so as to obtain an unsaturated aliphatic-9-substituted fluorene, which in turn, can be hydrogenated, if desired, to a saturated aliphatic-substituted product.

The plasticizers of the invention can also be prepared in accordance with Schoen et al., J. Am. Chem. Soc., vol. 77, page 6030 (1955), which describes the base-catalyzed alkylation of fluorene by the reaction of fluorene with various alkyl alcohols in the presence of sodium, thereby producing 9-alkylfluorenes. Similarly, fluorene can be reacted with an olefinic alcohol so as to obtain an unsaturated aliphatic-9-substituted fluorene.

In particular, the aliphatic-9-substituted fluorenes hereinabove described have been found to be efficient plasticizers for those vinyl resins consisting of either homopolymers of vinyl chloride or copolymers of vinyl chloride with vinyl acetate containing up to about 15 percent by weight of vinyl acetate. Thus, by the incorporation of these aliphatic-9-substituted fluorenes, the plasticized vinyl resin compositions of the invention can be milled or molded at desirably low temperatures and are rendered considerably more flexible as compared with the unplasticized resin. The utility of the aliphatic fluorene derivatives is somewhat surprising, since the compounds are hydrocarbons containing none of the functional groups such as ester groups generally found in conventional plasticizers for the vinyl resins.

In any given instance, the particular aliphatic-9-substituted fluorene plasticizer to be employed in accordance with the invention is determined primarily by the use intended for the resulting plasticized vinyl resin composition, for when different plasticizers within the broad scope of the invention are employed, corresponding differences may be encountered in one or more of the physical properties of the plasticized resin compositions. By way of illustration, certain of the plasticizers of the invention, especially the lower molecular weight compounds, wherein the 9-substituted aliphatic radicals contain about 8 carbon atoms or less, frequently find preferred application when resistance to oil extraction is a property primarily desired in the plasticized resin compositions. The higher molecular weight compounds, on the other hand, may be selected for use when lower volatility and improved low-temperature properties are the chief consideration. Moreover, under circumstances where limited compatibility with the vinyl resins may be exhibited, as for instance, in the case of certain of the alkyl-9-substituted fluorenes wherein the 9-substituted alkyl radicals possess about 8 carbon atoms or more, it may also be desirable to incorporate a conventional primary plasticizer such as dioctyl phthalate or other phthalate esters in the vinyl resin composition together with the alkyl-9-substituted fluorene. In addition, when desired, conventional primary plasticizers can also be utilized in conjunction with any of the other aliphatic-9-fluorene plasticizers contemplated by the invention.

The proportions of the components of the novel plasticized vinyl resin compositions of the invention will vary over a wide range depending upon the choice of components and the purpose for which the plasticized resin composition is intended. In general, particularly useful compositions are obtained employing from about 30 to about 100 percent by weight of the aliphatic-9-substituted fluorene based upon the weight of the vinyl resin, although lesser or greater proportions can also be employed satisfactorily. In those instances where the additional utilization of a conventional primary plasticizer is found desirable, useful compositions are obtained preferably employing from about 10 to about 75 percent by weight of the aliphatic-9-substituted fluorene and from about 30 to about 100 percent by weight of total plasticizer, based upon the weight of the vinyl resin. Again, lesser or greater proportions of plasticizer, i.e., of either the plasticizer of the invention or of the conventional primary plasticizer, or of both, can also be utilized satisfactorily.

Compositions coming within the scope of the invention include finished articles molded by extrusion, injection or otherwise, coatings deposited from solutions of the plasticized resins, coatings formed from plastisol and organosol dispersions, sheets and plastic masses obtained by incorporating the resin and plasticizers on hot roll mills, and mechanical mixtures of granular to powdered vinyl resins impregnated with the plasticizer. Also within the scope of the invention are compositions comprising vinyl resins plasticized as taught heren and containing in addition fillers or extenders, pigments, stabilizers and lubricants.

The method for preparing the plasticized vinyl resin compositions is not critical to the invention. A preferred method of preparation comprises suitably admixing the ingredients and milling the mixture on a two-roll mill at a temperature of between 150° C. and 170° C. for a period of about 5 to about 15 minutes whereupon a plasticized sheet suitable for molding is thereby obtained. Other convenient methods for preparing the plasticized vinyl resin compositions can also be employed. For example, the ingredients can be dry-blended, mixed in a Banbury mill, etc.

The invention is further illustrated, but not limited, by the following examples.

EXAMPLE 1

To a kettle of a short still equipped with a decanting head were charged the following: 83 grams of fluorene, 64 grams of 2-ethylhexanol, 0.5 gram of powdered potassium hydroxide and 250 milliliters of toluene. The mixture was then brought to reflux at atmospheric pressure and the water formed during the course of reaction removed as an azeotropic distillate with toluene. The upper, toluene layer of the condensate was returned to the still and the lower aqueous layer discarded. When water of condensation could no longer be collected in this manner, the source of heat to the reaction mixture was discontinued. The crude reaction product was then allowed to cool, washed with diluent hydrochloric acid and with water and subsequently fractionated. 9-(2-ethylhexylidene)fluorene was thereupon recovered in a 108-gram yield at a temperature of 214° C., under a pressure of 10 mm. of mercury.

EXAMPLE 2

To a three-liter hydrogenation bomb were charged the following: 276 grams of 9-(2-ethylhexylidene)fluorene, obtained in a manner similar to that described above in Example 1, 1000 milliliters of methanol and 5.0 grams of Raney nickel. The system was evacuated and a positive pressure of hydrogen applied. Hydrogen was slowly taken up at a temperature of between 20° C. to 30° C., under a hydrogen pressure of 500 p.s.i. The reaction mixture was then heated to a temperature of 50° C. for a period of three hours while maintaining the hydrogen pressure at 500 p.s.i. Upon termination of the reaction period, the reaction mixture was cooled and the Raney nickel catalyst separated therefrom by filtration. The crude reaction product was then fractionated, whereupon 9-(2-ethylhexyl)fluorene, was recovered in a 267-gram yield at a temperature of between 208° C. and 210° C., under a pressure of 10 mm. of mercury.

EXAMPLE 3

In a manner and using equipment similar to that described above in Example 1, a mixture containing 332 grams of fluorene, 252 grams of 2-ethyl-3-propylacrolein, 4 grams of powdered potassium hydroxide and 1000 milliliters of toluene was brought to reflux at atmospheric pressure. Upon completion of the reaction, the crude reaction product was washed with both dilute hydrochloric acid and water and subsequently fractionated. 9-(2-ethyl-2-hexenylidene)fluorene was thereupon recovered in a 252 gram-yield at a temperature of between 199° C., under a pressure of 10 mm. of mercury, and 217° C., under a pressure of 8 mm. of mercury.

EXAMPLE 4

In a manner and using equipment similar to that described above in Example 1, 450 grams of fluorene, 480 grams of an isomeric decanal mixture prepared by the Oxo reaction of tripropylene, 12 grams of powdered potassium hydroxide and 1700 milliliters of toluene was brought to reflux at atmospheric pressure. During a reflux period of thirty-six hours, a total of 50 milliliters of water was collected as an azeotropic distillate with toluene. Upon completion of the reaction, the crude reaction product was cooled and 30 milliliters of acetic acid added thereto in order to neutralize the alkaline catalyst. The neutralized product was then fractionated, whereupon an isomeric 9-decanylidenefluorene mixture was recovered in a 642-gram yield at a temperature of between 183° C. and 190° C., under a pressure of 1 mm. of mercury. Analysis of the product indicated an index of refraction: $N_D^{30}$ 1.5900.

EXAMPLE 5

In a manner and using equipment similar to that described above in Example 2, 350 grams of the isomeric 9-decanylidenefluorene mixture obtained in accordance with Example 4 were hydrogenated in the presence of 10 grams of Raney nickel and 1000 milliliters of methanol. Upon completion of the hydrogenation, the crude reaction product was cooled, filtered to remove the Raney nickel catalyst and subsequently fractionated. An isomeric 9-decylfluorene mixture was thereupon recovered in a 285-gram yield at a temperature of between 170° C. and 179° C., under a pressure of 1 mm. of mercury. Analysis of the product indicated an index of refraction: $N_D^{30}$ 1.5540 to 1.5563.

EXAMPLE 6

In a manner and using equipment similar to that described above in Example 1, a mixture containing 294 grams of fluorene, 373 grams of an isomeric tridecanal mixture prepared by the Oxo reaction of tetrapropylene, 8 grams of powdered potassium hydroxide and 2000 milliliters of toluene was brought to reflux at atmospheric pressure. During a reflux period of 48 hours, a total of 26 milliliters of water was collected as an azeotropic distillate with toluene. Upon termination of the reflux period, the crude reaction product was cooled, washed with both dilute hydrochloric acid and water and subsequently fractionated. An isomeric 9-tridecanylidenefluorene mixture was thereupon recovered in a 411-gram yield at a temperature of between 175° C. and 196° C., under a pressure of 0.5 mm. of mercury. Analysis of the product indicated an index of refraction: $N_D^{30}$ 1.5581 to 1.5613.

EXAMPLE 7

In a manner and using equipment similar to that described above in Example 2, 283 grams of the isomeric 9-tridecanylidenefluorene mixture obtained in accordance with Example 6 were hydrogenated in the presence of 10 grams of Raney nickel and 1000 milliliters of methanol. Upon completion of the hydrogenation, the crude reaction product was cooled, filtered to remove the Raney nickel catalyst and subsequently fractionated. An isomeric 9-tridecylfluorene mixture was thereupon recovered in a 213-gram yield at a temperature of between 181° C. and 200° C., under a pressure of 1 mm. of mercury. Analysis of the product indicated an index of refraction: $N_D^{30}$ 1.5479 to 1.5500.

EXAMPLE 8

Various aliphatic-9-substituted fluorenes such as those obtained in accordance with Examples 1 through 7 were evaluated as plasticizers for vinyl resins. The tests were conducted by manually mixing a resinous copolymer of vinyl chloride (95 percent by weight) and vinyl acetate (5 percent by weight) with plasticizer and milling the mixture for five minutes at a temperature of 158° C. on a laboratory two-roll mill. The particular resin employed in each instance had a molecular weight such that an 0.2 percent solution of the resin in nitrobenzene at a temperature of 20° C. had a reduced viscosity of 1.05. Samples from the millings were then molded for 10 minutes at a temperature of 158° C. by conventional compression molding techniques so as to obtain specimens suitable for testing. Each plasticizer was generally evaluated at three different concentrations in order that performances could be compared at a common interpolated level of flexibility in the resin compositions corresponding to a modulus of 1000 pounds per square inch at 100 percent elongation. This value, together with ultimate tensile strength and elongation at break, was read from a stress-strain curve obtained on a Scott L-6 tensile tester operating at a constant rate of elongation of 4 ft. per minute. The interpolated concentration of plasticizer effective in achieving such a level of flexibility in the resin compositions is indicated below in Table A as the "effective concentration." The remaining tabulated data was obtained for vinyl resin compositions containing the "effective concentration" of plasticizer in accordance with conventional testing techniques. In certain instances, as indicated in the table, the plasticizer employed contained an equimolar blend of an aliphatic-9-substituted fluorene and a conventional primary plasticizer, dioctyl phthalate, the "effective concentration" representing the concentration of the plasticizer blend. For comparison, one run was also conducted in which dioctyl phthalate was the sole plasticizer employed. In the table, the "effective concentration" is indicated in percent by weight based upon the weight of the vinyl resin; the "tensile strength," "load at 100% elongation" and the "stiffness modulus" are indicated in pounds per square inch; temperatures ($T_F$) and ($T_4$) are indicated in degrees centigrade; oil extraction and water extraction data are indicated as the percent weight loss of the plasticized resin compositions after 10 days at a temperature of 23° C. in either refined mineral oil or distilled water, respectively; the "SPI volatile loss" is indicated in percent based upon the weight of the plasticized resin compositions; the "sweat out" is indicated as observed after two weeks' storage.

*Table A*

| Plasticizer | Effective Concentration | Tensile Strength | Percent [1] Elongation at Break | Load at 100% Elongation | Stiffness [2] Modulus | Flex [3] Temperature ($T_F$) |
|---|---|---|---|---|---|---|
| 9-(2-Ethylhexylidene) fluorene | 45.8 | 2,425 | 310 | 1,000 | 460 | 0 |
| 9-(2-Ethyl-2-hexenylidene) fluorene | 40.0 | 2,600 | 305 | 1,500 | 540 | −5 |
| 1:1 Blend of 9-(2-ethyl hexyl)fluorene with dioctyl phthalate | 39.1 | 2,450 | 320 | 1,000 | 740 | −25 |
| 9-Decylfluorene | 45.7 | 2,060 | 325 | 1,000 | 350 | −21 |
| 1:1 Blend of 9-decylfluorene with dioctyl phthalate | 41.0 | 2,200 | 360 | 880 | 610 | −26 |
| 9-Tridecylfluorene | 47.3 | 1,950 | 320 | 1,000 | 475 | −28 |
| 1:1 Blend of Tridecyl fluorene with dioctyl phthalate | 34.0 | 2,600 | 275 | 1,700 | 1,675 | −10 |
| 9-Tridecanylidene fluorene | 47.6 | 2,050 | 325 | 1,000 | 380 | −20 |
| Dioctyl phthalate | 37.3 | 2,475 | 365 | 1,000 | 860 | −33 |

| Plasticizer | $T_4$ [4] | Brittle [5] Temperature | Oil Extraction | Water [6] Extraction | SPI Volatile Loss | Sweat Out |
|---|---|---|---|---|---|---|
| 9-(2-Ethylhexylidene) fluorene | 15 | 3 | 2.7 | 0.4 | 15.5 | None. |
| 9-(2-Ethyl-2-hexenylidene) fluorene | 14 | 6 | 1.5 | 1.1 | 16.3 | None. |
| 1:1 Blend of 9-(2-ethyl-hexyl)fluorene with dioctyl phthalate | 1.5 | −21 | 16.0 | 0.4 | 17.0 | None. |
| 9-Decylfluorene | 3 | −21 | 16.0 | 0.1 |  | Detectable. |
| 1:1 Blend of 9-decylfluorene with dioctyl phthalate | 0 | −30 | 15.8 | 0.1 | 12.2 | None. |
| 9-Tridecylfluorene | 3 | −25 | 27.7 | 0.2 |  | Detectable. |
| 1:1 Blend of Tridecyl fluorene with dioctyl phthalate | 15 | −16 | 4.5 | 0.1 | 5.8 | None. |
| 9-Tridecanylidene fluorene | 8 | −17 | 24.0 | 0.2 | 8.5 | None. |
| Dioctyl phthalate | −3 | −31 | 16.5 | 0.1 | 4.9 | None. |

[1] At a temperature of 23° C.
[2] ASTM Method D-747-50, at a temperature of 23° C.
[3] ASTM Method D-1043-51, at a pressure of 135,000 p.s.i.
[4] ASTM Method D-1043-51 at a pressure of 10,000 p.s.i.
[5] ASTM Method D-746-55T, Procedure A.
[6] ASTM Method D-1203-55, at a temperature of 70° C.

From the above Table A it can be seen that the physical properties of the plasticized vinyl resin compositions of the invention will vary depending upon the particular plasticizer incorporated therein. Thus, it is possible to select an aliphatic-9-substituted fluorene as plasticizer so as to meet the salient requirements imposed by any intended use for the plasticized resin compositions.

EXAMPLE 9

In a manner similar to that described in Example 8, plasticized vinyl resin compositions were prepared employing the copolymer resin of Example 8, and both 9-decanylidenefluorene and blends of 9-decanylidenefluorene with dioctyl phthalate as plasticizer, in varying concentrations. The plasticizers were evaluated, except as otherwise indicated below, as also described in Example 9. The results obtained are tabulated below in Table B. In the table, the "concentration" of plasticizer is indicated in percent by weight based upon the weight of the vinyl resin; the "tensile strength," "percent elongation at break," "load at 100% elongation" and the "stiffness modulus" were each determined at a temperature of 24.5° C.; the oil extraction and water extraction data were obtained at a temperature of 25° C.

Table B

| Plasticizer | Concentration | Tensile Strength | Percent Elongation at Break | Load at 100% Elongation | Stiffness Modulus | Flex Temperature, $T_F$ |
|---|---|---|---|---|---|---|
| 9-Decanylidenefluorene | 36.6 | 2,700 | 230 | 2,050 | 2,650 | 10 |
| 9-Decanylidenefluorene | 45.1 | 2,050 | 280 | 1,000 | 460 | −6 |
| 1:1 Blend of dioctyl phthalate with 9-decanylidenefluorene | 34.0 | 2,875 | 245 | 1,890 | 1,670 | −6 |
| 3:1 Blend of dioctyl phthalate with 9-decanylidenefluorene | 34.0 | 2,850 | 315 | 1,550 | 1,215 | −15 |

| Plasticizer | $T_4$ | Brittle Temperature | Oil Extraction | Water Extraction | SPI Volatile Loss | Sweat Out |
|---|---|---|---|---|---|---|
| 9-Decanylidenefluorene | 23 | 14 | 0.4 | 0.1 | 7.0 | None |
| 9-Decanylidenefluorene | 10 | −1 | 0.8 | 0.2 | 10.2 | None |
| 1:1 Blend of dioctyl phthalate with 9-decanylidenefluorene | 15 | −8 | 2.1 | nil | 4.2 | None |
| 3:1 Blend of dioctyl phthalate with 9-decanylidenefluorene | 10 | −18 | 6.5 | nil | 3.8 | None |

What is claimed is:

1. A plasticized vinyl resin composition comprising a resin selected from the group consisting of polyvinyl chloride and copolymers of vinyl chloride and vinyl acetate containing up to about 15 percent by weight of vinyl acetate, and an aliphatic-9-substituted fluorene represented by the general formula:

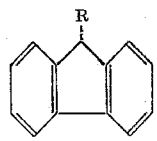

wherein R represents an aliphatic radical containing from about 4 to about 18 carbon atoms.

2. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of an aliphatic-9-substituted fluorene represented by the general formula:

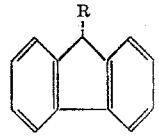

wherein R represents an aliphatic radical containing from about 4 to about 18 carbon atoms.

3. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a 9-alkylidenefluorene wherein the 9-alkylidene radical contains from about 4 to about 18 carbon atoms.

4. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a 9-alkenylidenefluorene wherein the 9-alkenylidene radical contains from about 4 to about 18 carbon atoms.

5. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a 9-alkylfluorene wherein the 9-alkyl radical contains from about 4 to about 18 carbon atoms.

6. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a 9-alkenylfluorene wherein the 9-alkenyl radical contains from about 4 to about 18 carbon atoms.

7. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of 9-(2-ethylhexylidene)fluorene.

8. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of 9-decanylidenefluorene.

9. A plasticized vinyl resin composition comprising a resin selected from the group consisting of polyvinyl chloride and copolymers of vinyl chloride and vinyl acetate, containing up to about 15 percent by weight of vinyl acetate, and from about 30 to about 100 percent by weight based upon the weight of the resin of 9-tridecanylidenefluorene.

10. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of 9-(2-ethyl-2-hexenylidene)fluorene.

11. A plasticized vinyl resin composition comprising a resin selected from the group consisting of polyvinyl chloride and copolymers of vinyl chloride and vinyl acetate containing up to about 15 percent by weight of vinyl acetate, a primary plasticizer for said resin and an aliphatic-9-substituted fluorene represented by the general formula:

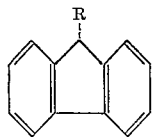

wherein R represents an aliphatic radical containing from about 4 to about 18 carbon atoms.

12. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of a primary plasticizer for said resin and an aliphatic-9-substituted fluorene represented by the general formula:

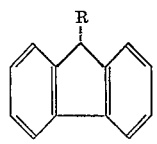

wherein R represents an aliphatic radical containing from about 4 to about 18 carbon atoms, said aliphatic-9-substituted fluorene being present in a concentration of from about 10 to about 75 percent by weight based upon the weight of the resin.

13. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of a primary plasticizer for said resin and a 9-alkylfluorene wherein the 9-alkyl radical contains from about 4 to about 18 carbon atoms, said 9-alkylfluorene being present in a concentration of from about 10 to about 75 percent by weight based upon the weight of the resin.

14. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of a primary plasticizer for said resin and a 9-alkenylfluorene wherein the 9-alkenyl radical contains from about 4 to about 18 carbon atoms, said 9-alkenylfluorene being present in a concentration of from about 10 to about 75 percent by weight based upon the weight of the resin.

15. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of a primary plasticizer for said resin and a 9-alkylidenefluorene wherein the 9-alkylidene radical contains from about 4 to about 18 carbon atoms, said 9-alkylidenefluorene being present in a concentration of from about 10 to about 75 percent by weight based upon the weight of the resin.

16. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of a primary plasticizer for said resin and a 9-alkenylidenefluorene wherein the 9-alkenylidene radical contains from about 4 to about 18 carbon atoms, said 9-alkenylidenefluorene being present in a concentration of from about 10 to about 75 percent by weight based upon the weight of the resin.

17. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of dioctyl phthalate and 9-(2-ethylhexyl)-fluorene, said 9-(2-ethylhexyl)fluorene being present in a concentration of from about 10 to about 75 percent by weight based upon the weight of the resin.

18. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of dioctyl phthalate and 9-decylfluorene, said 9-decylfluorene being present in a concentration of from about 10 to about 75 percent by weight based upon the weight of the resin.

19. A plasticized vinyl resin composition comprising a resin selected from the group consisting of polyvinyl chloride and copolymers of vinyl chloride and vinyl acetate containing up to about 15 percent by weight of vinyl acetate, and from about 30 to about 100 percent by weight based upon the weight of the resin of a plasticizer consisting of dioctyl phthalate and 9-tridecylfluorene, said 9-tridecylfluorene being present in a concentration of from about 10 to about 75 percent by weight based upon the weight of the resin.

20. A plasticized vinyl resin composition comprising a resin selected from the group consisting of polyvinyl chloride and copolymers of vinyl chloride and vinyl acetate, containing up to about 15 percent by weight of vinyl acetate, and from about 30 to about 100 percent by weight based upon the weight of the resin of a plasticizer consisting of dioctyl phthalate and 9-decanylidenefluorene, said 9-decanylidenefluorene being present in a concentration of from about 10 to about 75 percent by weight based upon the weight of the resin.

No references cited.